J. E. LAFFERTY.
VEGETABLE STOREHOUSE.
APPLICATION FILED MAY 22, 1909.
961,454.
Patented June 14, 1910.
3 SHEETS—SHEET 1.
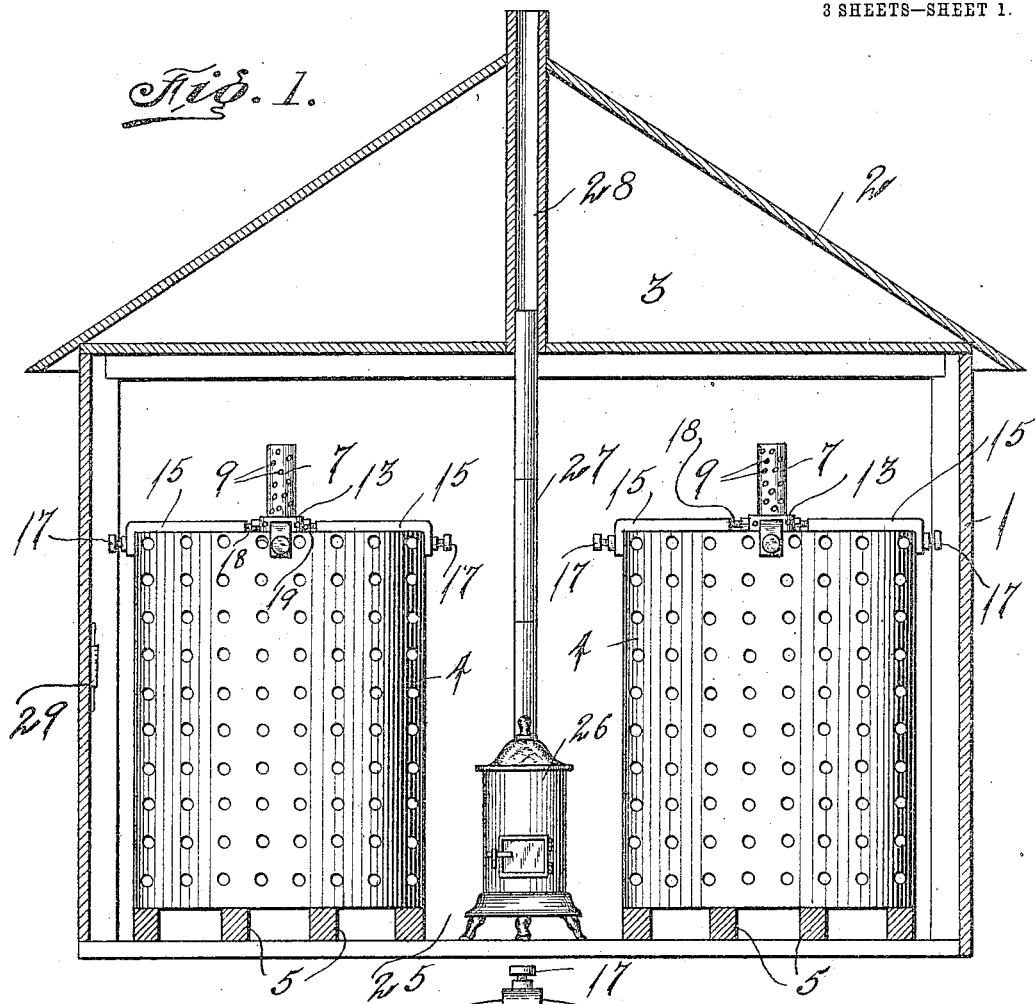
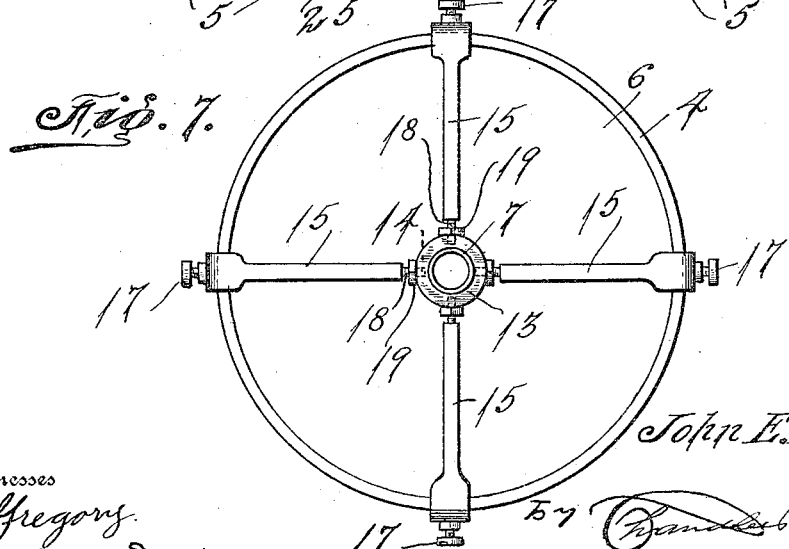
Witnesses
Jos Gregory.
Inventor
John E. Lafferty.
By Chandler & Chandler
Attorneys J. E. LAFFERTY.
VEGETABLE STOREHOUSE.
APPLICATION FILED MAY 22, 1909.
961,454.
Patented June 14, 1910.
3 SHEETS—SHEET 2.
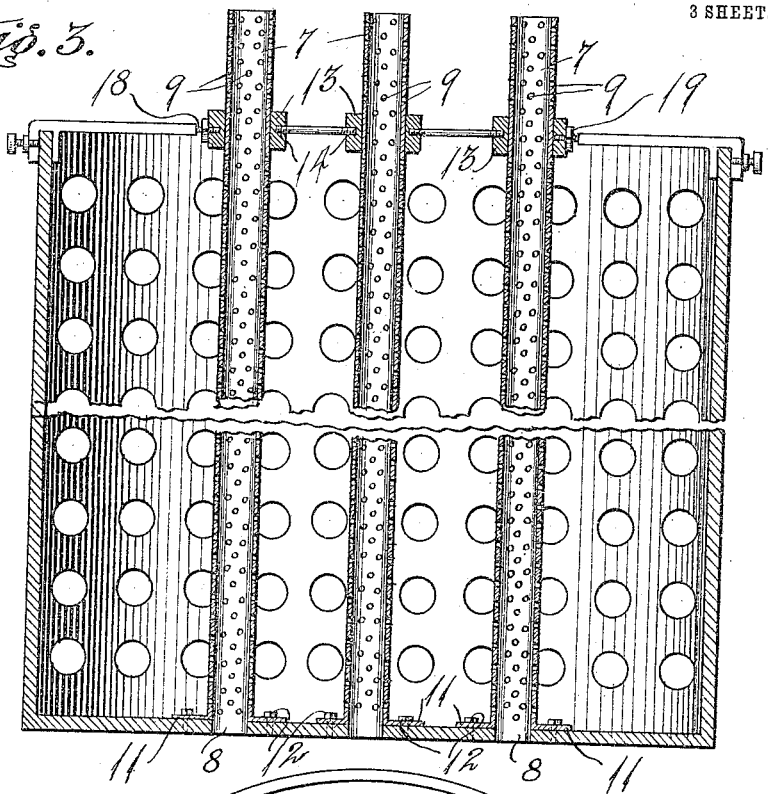
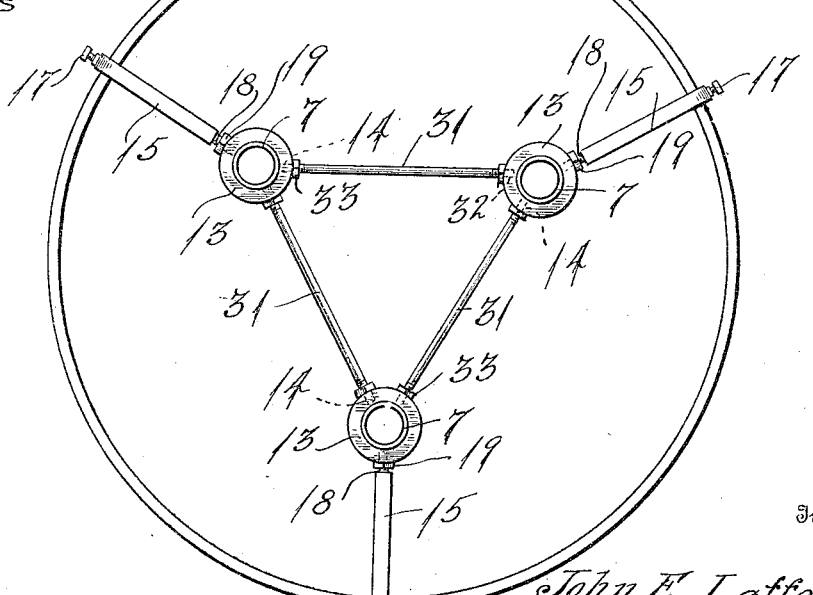

J. E. LAFFERTY.
VEGETABLE STOREHOUSE.
APPLICATION FILED MAY 22, 1909.

961,454.

Patented June 14, 1910.
3 SHEETS—SHEET 3.

UNITED STATES PATENT OFFICE.

JOHN E. LAFFERTY, OF FOYIL, OKLAHOMA.

VEGETABLE-STOREHOUSE.

961,454.

Specification of Letters Patent. Patented June 14, 1910.

Application filed May 22, 1909. Serial No. 497,711.

*To all whom it may concern:*

Be it known that I, JOHN E. LAFFERTY, a citizen of the United States, residing at Foyil, in the county of Rogers, State of Oklahoma, have invented certain new and useful Improvements in Vegetable - Storehouses; and I do hereby declare the following to be a full, clear, and exact description of the invention, such as will enable others skilled in the art to which it appertains to make and use the same.

This invention relates to new and useful improvements in buildings, and it has particular reference to a building designed to preserve vegetables, such for instance as sweet potatoes, against temperature variations.

One object of the invention is to provide a vegetable bin embodying a novel construction, combination and arrangement of parts, the details of which will appear in the course of the following description, wherein reference is had to the accompanying drawings forming a part of this specification, like characters of reference designating similar parts throughout the several views, wherein:—

Figure 1 is a central longitudinal section of a building constructed in accordance with my invention. Fig. 2 is a top plan view of one of the vegetable bins embodied in the present invention. Fig. 3 is a section taken through one of such bins to show the construction and arrangement of the ventilating tubes thereof. Fig. 4 is a detail side elevation of a preferred embodiment of a reinforcing member, for use in connection with a cylindrical bin. Fig. 5 is a similar view of a reinforcing member made in adjustably connected sections and including a swiveled end, and Fig. 6 is a top plan view of a bin of rectangular outline constructed in accordance with the present invention. Fig. 7 is a top plan view of a bin of circular contour and showing the arrangement of the supports when attached to a single ventilating tube.

The invention in its practical embodiment comprises side walls 1 of any desirable construction, a roof 2 and a loft 3. Within the inclosure thus formed are arranged at determinate intervals vegetable bins 4 supported from the floor or ground upon spaced joists or posts 5, the air being designed to circulate freely through the bins 4. Said bins may be of cylindrical shape or of rectangular shape, and have open upper ends 6. Ventilating tubes 7 are projected at selected intervals through said bins and communicate with openings 8 in the bottom thereof. The tubes 7 are open-ended, and are formed throughout their lineal extent with apertures 9, which permit the distribution of air equally through the bin. It is preferred to construct the tubes 7 of separate material from the bin and to fix the same thereto. To this end each of said tubes has at its lower extremity a circumscribing flange 11 which is fixed to the bottom of the bin by bolts 12 or other desired fastening means. It is also preferred to reinforce said tubes adjacent their upper ends, and with this object in view, each of said tubes carries a collar 13, having openings 14 therein at equidistant intervals. Radially extending members 15 have their inner ends projected into said collar, and their outer ends formed with depending spaced ears 16 which overhang the edge of the bin 4. Binding screws 17 are threaded through the outermost ears 16 for frictional engagement with the side of the bin. The members 15 adjacent their inner ends are threaded as at 18, to receive a binding nut 19, which is designed to frictionally engage the collar 13. The preferred embodiment of the members 15 is shown in Fig. 4, and as disclosed in said figure, the members are specially designed for use with a bin of cylindrical contour. In Fig. 6 a modification is shown by means of which said members may be applied to a bin of rectangular contour and may be adjusted to increase or decrease their length in connection with bins of varying dimensions. It will be noted that in Fig. 5 the member 15 is constructed of an outer section 20 and an inner section 21, the two sections being adjustably connected by a conventional bolt and slot joint 22. The inner section 21 is provided at its inner end with the threads 18 and the nut 19. The lug 16 may be formed directly on the member 20 or may be carried by a swiveled head 23, its pivot being indicated at 24.

Where a single bin is equipped with more than one tube 7, each of said tubes is properly braced with relation to the edge of the bin, and said tubes are likewise braced with relation to one another by tie rods 31 interposed therebetween, and having their ends in the openings 14, said rods being threaded as at 32 adjacent their ends and carrying binding nuts 33.

The bins 4 are so arranged that aisles 25 occur therebetween and centrally of the building is a stove 26, from which the products of combustion are conducted by a pipe-plate 27 communicating with a chimney 28, disposed in the loft 3. For the sake of convenience one of the walls 1 is equipped with a thermometer 29, so that the temperature within the building may be determined.

It will be apparent from the foregoing description, that the heat will be distributed from the stove 26 uniformly through the bins 4 by means of the tubes 7. Owing to the fact that said tubes are open-ended, a free draft is afforded therethrough, the air being admitted into the building through suitable ventilators (not shown), and circulating beneath the bins and through the tubes 7. The fresh air admitted has its temperature instantly modified by the volume of hot air normally maintained within the building.

From the foregoing description, it will be seen that simple and efficient means are provided for accomplishing the objects of the invention, but while the elements herein shown and described are well adapted to serve the functions set forth, it is obvious that various minor changes may be made in the proportions, shape and arrangement of the several parts without departing from the spirit and scope of the invention as defined in the appended claims.

Having thus described my invention, what is claimed as new, is:—

1. In a vegetable store-house, a bin, a ventilating tube rising from the floor of said bin, a collar fitted at the upper end portion of the tube, and a support having its inner end detachably secured to the collar and its outer end bent downwardly and divided to straddle the upper end of the bin.

2. In a vegetable store-house, a bin, a ventilating tube rising from the floor of said bin, a collar adjustably secured at the upper end portion of the tube, and a support having its inner end threaded into the collar and its outer end bent downwardly and divided to straddle the upper end of the bin.

3. In a vegetable store-house, a bin, a plurality of ventilating tubes rising from the floor of said bin, collars arranged adjacent the upper end portions of the tubes, connections between said collars, and a plurality of supports having their inner ends threaded into said collars and their outer ends bent downwardly and divided to straddle the upper end of the bin.

In testimony whereof, I affix my signature, in presence of two witnesses.

JOHN E. LAFFERTY.

Witnesses:
W. C. SKELTON,
T. L. LANE.